(12) United States Patent
Yamada et al.

(10) Patent No.: US 11,638,447 B2
(45) Date of Patent: May 2, 2023

(54) BATTERY UNIT AND FLAVOR INHALER

(71) Applicant: JAPAN TOBACCO INC., Tokyo (JP)

(72) Inventors: Manabu Yamada, Tokyo (JP); Takeshi Akao, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 487 days.

(21) Appl. No.: 16/798,985

(22) Filed: Feb. 24, 2020

(65) Prior Publication Data

US 2020/0194758 A1 Jun. 18, 2020

Related U.S. Application Data

(63) Continuation of application No. PCT/JP2017/034871, filed on Sep. 27, 2017.

(51) Int. Cl.

| | |
|---|---|
| *A24F 13/00* | (2006.01) |
| *A24F 40/53* | (2020.01) |
| *H01M 10/42* | (2006.01) |
| *H01M 50/24* | (2021.01) |
| *H01M 50/107* | (2021.01) |
| *H01M 50/202* | (2021.01) |
| *A24F 40/10* | (2020.01) |

(Continued)

(52) U.S. Cl.
CPC ........... *A24F 40/53* (2020.01); *H01M 10/425* (2013.01); *H01M 50/107* (2021.01); *H01M 50/202* (2021.01); *H01M 50/24* (2021.01); *A24F 40/10* (2020.01); *A24F 40/20* (2020.01); *A24F 40/30* (2020.01); *H01M 50/242* (2021.01); *H01M 2220/30* (2013.01)

(58) Field of Classification Search
CPC ........................................ A24F 47/00
USPC .................................. 131/328–329
See application file for complete search history.

(56) References Cited

U.S. PATENT DOCUMENTS

| | | | | |
|---|---|---|---|---|
| 2008/0022998 A1* | 1/2008 | Hamano | .............. | A61M 11/042 |
| | | | | 128/200.14 |
| 2009/0123816 A1 | 5/2009 | Jang | | |

(Continued)

FOREIGN PATENT DOCUMENTS

| | | |
|---|---|---|
| JP | 2001-351594 A | 12/2001 |
| JP | 2009-123700 A | 6/2009 |

(Continued)

OTHER PUBLICATIONS

Extended European Search Report for European Application No. 17927313.1, dated Apr. 9, 2021.

(Continued)

*Primary Examiner* — Phuong K Dinh
(74) *Attorney, Agent, or Firm* — Birch, Stewart, Kolasch & Birch, LLP (57) ABSTRACT

A battery unit is installed in a flavor inhaler with an atomizing unit that atomizes an aerosol-generating material according to a puffing action of inhaling air through an air passage leading from an air inlet to an air outlet. The battery unit includes a battery, an electronic component configured to control the atomizing unit, and a housing configured to accommodate the battery and the electronic component. The electronic component is located in a predetermined portion of the battery unit. The predetermined portion includes a water detection member configured to detect water that enters the predetermined portion.

11 Claims, 5 Drawing Sheets

(51) Int. Cl.
*A24F 40/20* (2020.01)
*A24F 40/30* (2020.01)
*H01M 50/242* (2021.01)

(56) References Cited

U.S. PATENT DOCUMENTS

| | | |
|---|---|---|
| 2011/0129697 A1 | 6/2011 | Sim et al. |
| 2012/0111347 A1 | 5/2012 | Hon |
| 2013/0081642 A1* | 4/2013 | Safari .................... A24B 15/16 131/347 |
| 2014/0261495 A1 | 9/2014 | Novak, III et al. |
| 2014/0345633 A1 | 11/2014 | Talon et al. |
| 2016/0109115 A1* | 4/2016 | Lipowicz ................. H05B 3/12 392/395 |
| 2016/0213065 A1* | 7/2016 | Wensley .................. H05B 3/16 |
| 2017/0156404 A1 | 6/2017 | Novak, III et al. |
| 2018/0296779 A1 | 10/2018 | Takeuchi et al. |

FOREIGN PATENT DOCUMENTS

| | | |
|---|---|---|
| JP | 2009-267645 A | 11/2009 |
| JP | 2011-119254 A | 6/2011 |
| JP | 5247711 B2 | 7/2013 |
| JP | 2016-512681 A | 5/2016 |
| WO | WO 2008/108889 A1 | 9/2008 |
| WO | WO 2017/041646 A1 | 3/2017 |
| WO | WO 2017/109868 A1 | 6/2017 |

OTHER PUBLICATIONS

International Search Report (PCT/ISA/210) issued in PCT/JP2017/034871, dated Dec. 26, 2017.
Taiwanese Office Action issued in Application No. 106134368, dated Dec. 18, 2008.
Japanese Office Action for Japanese Application No. 2021-144508, dated December 5. 2022, with an English translation.

* cited by examiner

BATTERY UNIT AND FLAVOR INHALER

CROSS REFERENCE TO RELATED APPLICATIONS

The present application is a continuation application of International Application No. PCT/JP2017/034871, filed on Sep. 27, 2017.

TECHNICAL FIELD

The invention relates to a battery unit and a flavor inhaler.

BACKGROUND ART

A flavor inhaler with a battery unit and an atomizing unit has lately become known. The flavor inhaler has an air passage leading from an air inlet to an air outlet. The atomizing unit atomizes an aerosol-generating material according to a puffing action of inhaling air through the air passage (Patent Literature 1, for example).

CITATION LIST

Patent Literature

PTL 1: Japanese Patent No. 5247711

SUMMARY OF INVENTION

A first feature is a battery unit installed in a flavor inhaler with an atomizing unit that atomizes an aerosol-generating material according to a puffing action of inhaling air through an air passage leading from an air inlet to an air outlet. The battery unit includes a battery, an electronic component configured to control the atomizing unit, and a housing configured to accommodate the battery and the electronic component. The electronic component is located in a predetermined portion of the battery unit. The predetermined portion includes a water detection member configured to detect water that enters the predetermined portion.

A second feature according to the first feature is that the predetermined portion is provided with an opening in communication with exterior space of the housing.

A third feature according to the first or second feature is that the battery unit has a shape extending along a longitudinal direction, that the battery unit includes a connecting portion that mechanically connects the battery unit and the atomizing unit and a distal portion located across the battery from the connecting portion, and that the predetermined portion is the distal portion.

A fourth feature according to any one of the first to third features, the water detection member is located in a portion other than the air passage.

A fifth feature according to any one of the first to fourth features, the water detection member is located across the electronic component from the battery.

A sixth feature according to any one of the first to fifth features, the electronic component includes an inhalation sensor configured to detect the puffing action.

A seventh feature according to the six feature referring to the second feature is that the housing includes a first hollow space and a second hollow space which are separated by the inhalation sensor so as not to come into communication with each other, that the first hollow space is in communication with the air inlet, and that the second hollow space is in communication with the opening.

An eighth feature according to any one of the third feature referring to the second feature, and the fourth to seventh features referring to the second and third features is that the opening is located in a lateral surface of the distal portion, and that the water detection member is located in an end face of the distal portion.

A ninth feature according to any one of the first to eighth features is that at least a part of a portion of the electronic component, which is exposed to space in communication with the opening, is coated with a liquid impermeable member.

A tenth feature according to the ninth feature is that the electronic component includes an inhalation sensor configured to detect the puffing action, and that the inhalation sensor is exposed to the space in communication with the opening.

An eleventh feature is a flavor inhaler including an atomizing unit configured to atomize an aerosol-generating material according to a puffing action of inhaling air through an air passage leading from an air inlet to an air outlet, and a battery unit. The battery unit includes a battery, an electronic component configured to control the atomizing unit, and a housing configured to accommodate the battery and the electronic component. The electronic component is located in a predetermined portion of the battery unit. The predetermined portion includes a water detection member configured to detect water that enters the predetermined portion.

Advantageous Effects of Invention

One aspect provides the battery unit and the flavor inhaler, which are capable of recognizing the deterioration of the electronic component, which is caused by the water that enters the predetermined portion.

DESCRIPTION OF EMBODIMENT

An embodiment will be discussed below. In the following descriptions of the drawings, the same or similar elements are provided with the same or similar reference marks. It should be noted that the drawings are schematic diagrams, and therefore that the proportions of dimensions and the like might be different from actual proportions.

Specific dimensions and the like should be judged with reference to the following descriptions. Needless to say, there might be difference between the drawings in terms of relativity and proportions of dimensions of some parts.

Summary of Disclosure

One of the matters associated with the flavor inhaler mentioned under the Background Art is that, due to its property of atomizing the aerosol-generating material according to the puffing action, the battery unit has to be provided with the opening in communication with the exterior space (atmospheric space) of the housing of the flavor inhaler.

However, the battery unit includes the electronic component in addition to the battery, and it is necessary to consider a possibility that the electronic component is deteriorated by the water that enters the predetermined portion in which the electronic component is located.

To deal with the foregoing matter, the battery unit according to the Summery of Disclosure is located in a flavor inhaler including an atomizing unit configured to atomize an aerosol-generating material according to a puffing action of inhaling air through an air passage leading from an air inlet to an air outlet. The battery unit includes a battery, an electronic component configured to control the atomizing unit, and a housing configured to accommodate the battery and the electronic component. The electronic component is located in a predetermined portion of the battery unit. The predetermined portion includes a water detection member configured to detect water that enters the predetermined portion.

According to the Summery of Disclosure, the predetermined portion in which the electronic component is located includes the water detection member configured to detect the water that enters the predetermined portion. This makes it possible to recognize deterioration of the electronic component, which is caused by the water that enters the predetermined portion.

Embodiment (Flavor Inhaler)

Figure 1:
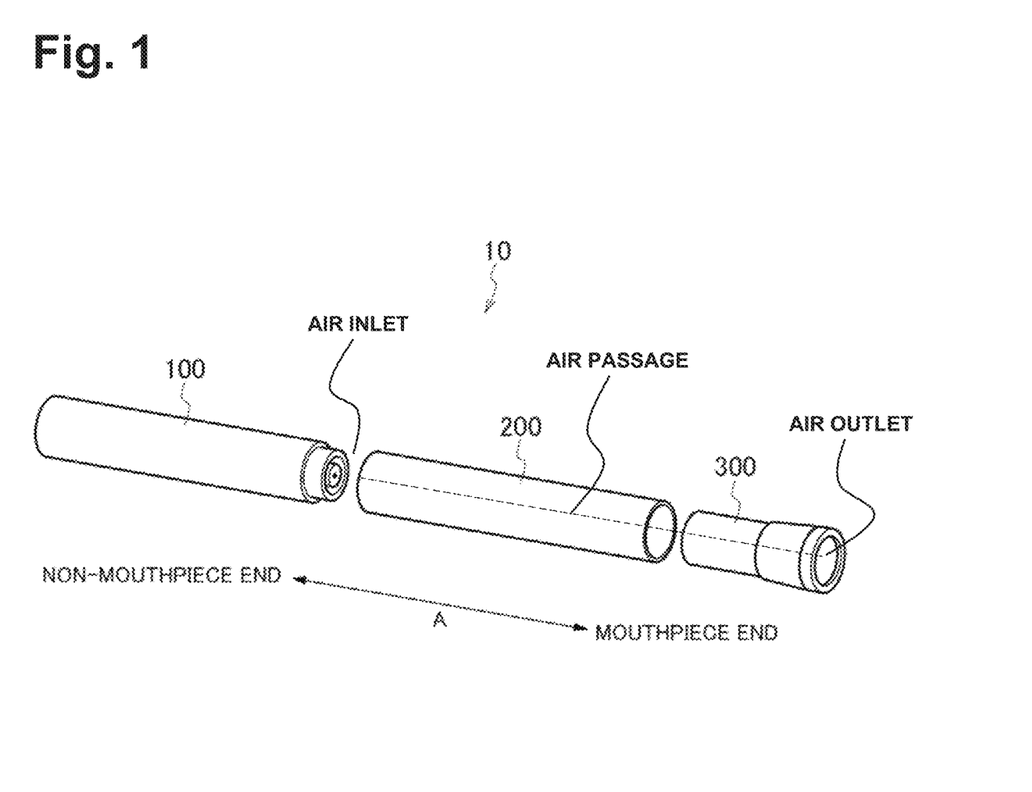
FIG. 1 is a perspective view showing a flavor inhaler 10 according to an embodiment.

A flavor inhaler according to an embodiment will be discussed below. FIG. 1 is a perspective view showing a flavor inhaler 10 according to an embodiment. The flavor inhaler 10 is a device for inhaling a flavor without inflammation. The flavor inhaler 10 has a shape extending along a longitudinal direction A that extends from a non-mouthpiece end toward a mouthpiece end.

As illustrated in FIG. 1, the flavor inhaler 10 includes a battery unit 100, an atomizing unit 200, and a flavor unit 300. The flavor inhaler 10 includes an air passage leading from an air inlet to an air outlet. The air inlet may be located in a boundary portion between the battery unit 100 and the atomizing unit 200. The air outlet may be located in one end (mouthpiece end) of the flavor unit 300.

The battery unit 100 is a unit including a battery (battery 123 mentioned later) configured to accumulate electric power for driving the flavor inhaler 10. The battery unit 100 has a shape extending along a longitudinal direction A. The battery unit 100 is electrically and mechanically connected to the atomizing unit 200. The battery unit 100 may be attachable to and detachable from the atomizing unit 200. The battery unit 100 will be described later in detail (see FIG. 2).

The atomizing unit 200 is a unit configured to atomize an aerosol-generating material according to an action of inhaling air through the air passage. The atomizing unit 200 has a shape extending along a longitudinal direction A. The atomizing unit 200 is electrically and mechanically connected to the battery unit 100. The atomizing unit 200 may be attachable to and detachable from the battery unit 100. The atomizing unit 200 will be described later in detail (see FIG. 3).

The flavor unit 300 is a unit including a flavor source that provides a flavor to aerosol released from the atomizing unit 200. The flavor unit 300 is attachable to and detachable from the atomizing unit 200. For example, the flavor unit 300 includes a pair of air-permeable members (for example, mesh bodies, files and others, etc.). The flavor source is disposed in a space separated by the pair of members. The flavor source may comprise shred tobacco or a formed body of granular tobacco material. The flavor source may comprise another plant than tobacco (for example, mint, herb or another like plant). The flavor source may include a flavor such as menthol.

(Battery Unit)

Figure 2:
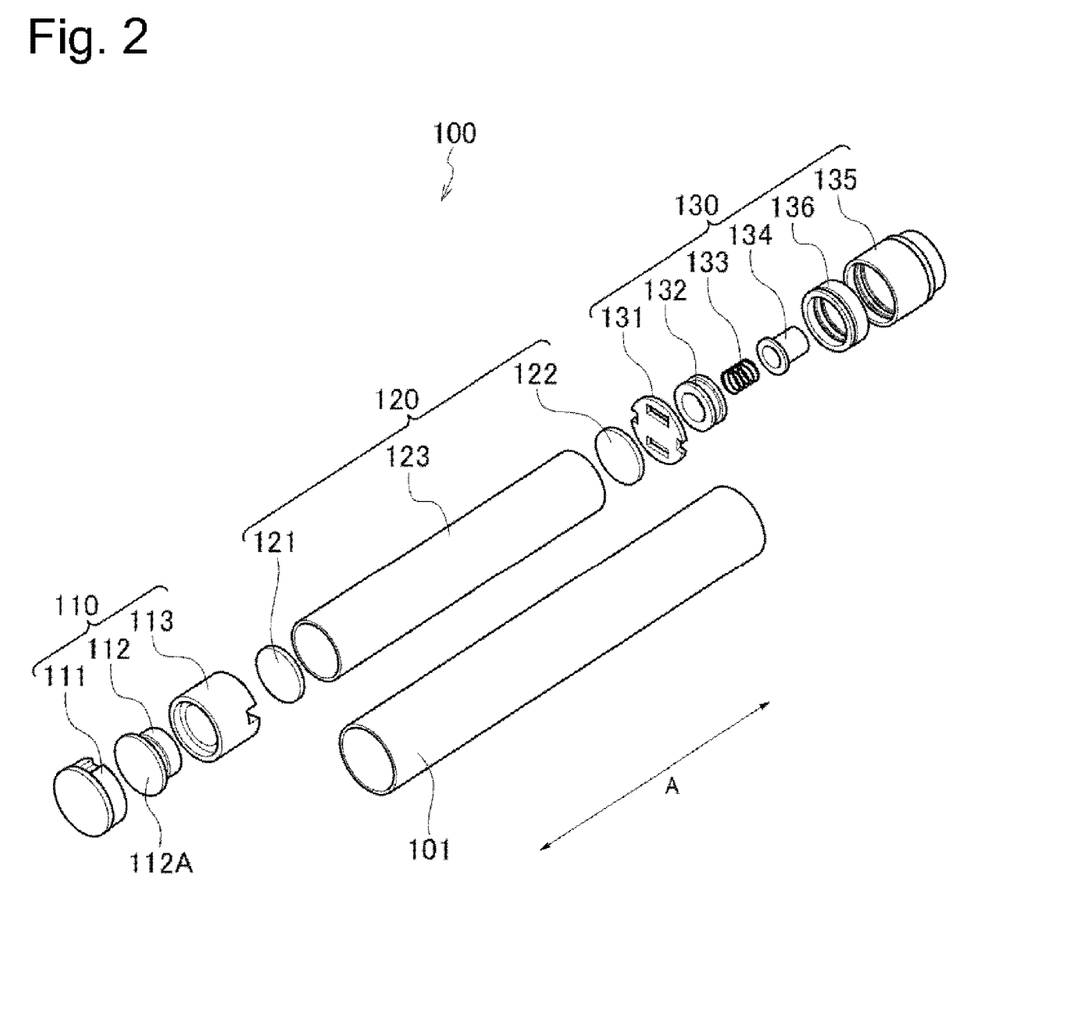
FIG. 2 is an exploded perspective view of a battery unit 100 according to the embodiment.

The battery unit 100 according to the embodiment will be described below. FIG. 2 is an exploded perspective view of the battery unit 100 according to the embodiment.

As illustrated in FIG. 2, the battery unit 100 includes a housing 101 extending along the longitudinal direction A. The housing 101 accommodates a distal portion 110, a battery portion 120, and a connecting portion 130.

The distal portion 110 is located on a distal end side of the battery portion 120 in the battery unit 100. The distal portion 110 includes a cover 111, an electronic component 112, and a base member 113. The cover 111 closes a distal end of the housing 101. The electronic component 112 controls at least the atomizing unit 200. The electronic component 112 includes a base plate 112A. The base plate 112A has a base plate surface that is provided with a CPU, a memory, a light-emitting element, an inhalation sensor, and the like. The base plate surface of the base plate 112A may face the cover 111. The base member 113 supports the electronic component 112.

The battery portion 120 includes a cushioning member 121, a cushioning member 122, and the battery 123. The cushioning member 121 and the cushioning member 122 absorb impact on the battery 123. For example, the cushioning member 121 and the cushioning member 122 are made of resin, such as ethylene-vinyl acetate copolymer (EVA). The battery 123 may be a disposable or rechargeable battery.

The connecting portion 130 is mechanically connected to the atomizing unit 200. The connecting portion 130 includes a spacer 131, a base member 132, an elastic member 133, an internal electrode 134, an external electrode 135, and an insulating member 136. The spacer 131 separates the cushioning member 122 and the base member 132 from each other. The base member 132 supports the elastic member 133 and the internal electrode 134. The elastic member 133 supports the internal electrode 134 in such a matter that the internal electrode 134 is movable along the longitudinal direction A. The internal electrode 134 is electrically connected to a first electrode (plus or minus electrode) of the battery 123. The internal electrode 134 is electrically connected to an electrode (internal electrode 211 discussed later) of the atomizing unit 200. The electrical connection between the internal electrode 134 and the electrode of the atomizing unit 200 is secured by an elastic force of the elastic member 133. The external electrode 135 is electrically connected to a second electrode (minus or plus electrode) of the battery 123. The external electrode 135 is electrically connected to an electrode (external electrode 212 discussed later) of the atomizing unit 200. The electrical connection between the external electrode 135 and the electrode of the atomizing unit 200 is secured by fitting (for example, screwing). The insulating member 136 electrically insulates the internal electrode 134 and the external electrode 135.

The internal electrode 134 is disposed on an inner side of the external electrode 135 as viewed in section perpendicular to the longitudinal direction A. The insulating member 136 is disposed between the internal electrode 134 and the external electrode 135 as viewed in section perpendicular to the longitudinal direction A.

(Atomizing Unit)

Figure 3:
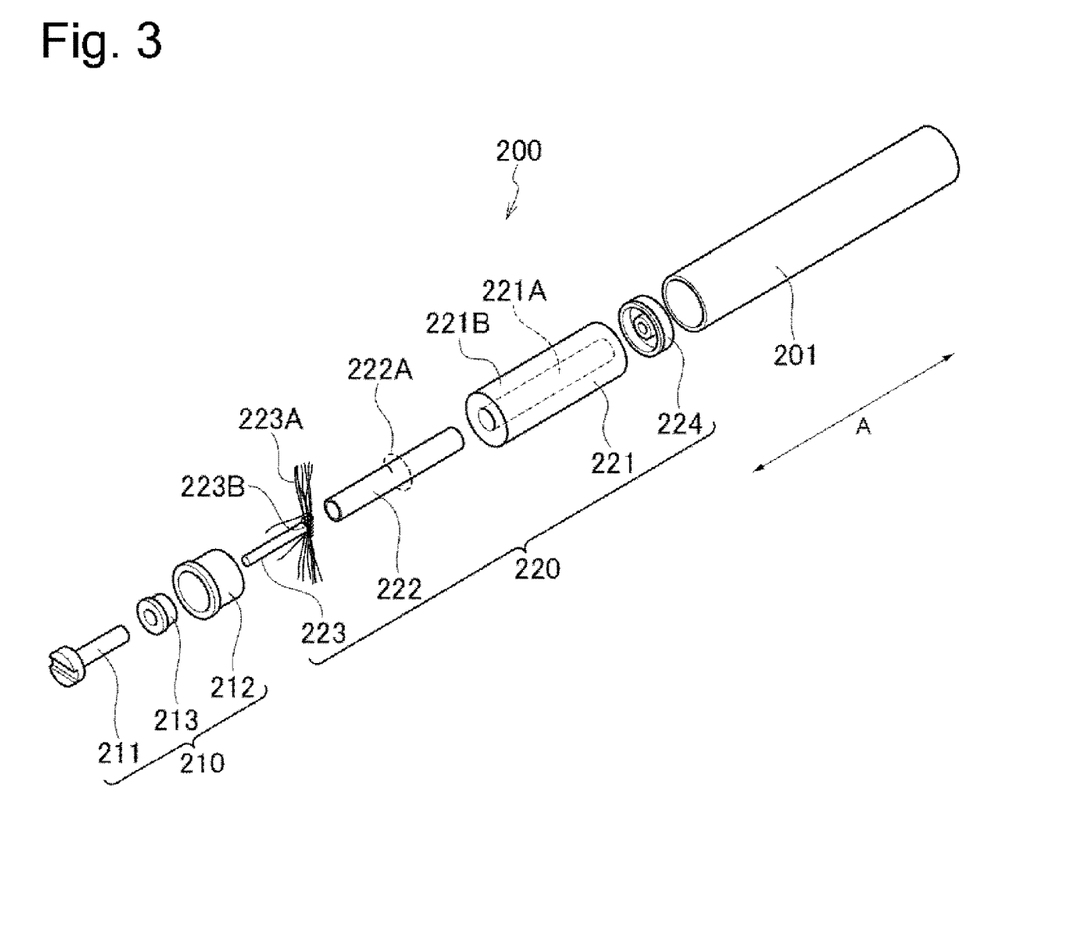
FIG. 3 is an exploded perspective view of an atomizing unit 200 according to the embodiment.

The atomizing unit 200 according to the embodiment will be described below. FIG. 3 is an exploded perspective view of the atomizing unit 200 according to the embodiment.

As illustrated in FIG. 3, the atomizing unit 200 includes a housing 201 extending along the longitudinal direction A. The atomizing unit 200 accommodates a connecting portion 210 and an atomizing portion 220.

The connecting portion 210 is mechanically connected to the battery unit 100. The connecting portion 210 includes the internal electrode 211, the external electrode 212, and an insulating member 213. The internal electrode 211 is electrically connected to the electrode (internal electrode 134 mentioned above) of the battery unit 100. Electrically connected to the internal electrode 211 is a first lead wire extending from a heater 223B. The external electrode 212 is electrically connected to the electrode (external electrode 135 mentioned above) of the battery unit 100. Electrically connected to the external electrode 212 is a second lead wire extending from the heater 223B. The insulating member 213 electrically insulates the internal electrode 211 and the external electrode 212.

The internal electrode 211 is disposed on an inner side of the external electrode 212 as viewed in section perpendicular to the longitudinal direction A. The insulating member 213 is disposed between the internal electrode 211 and the external electrode 212 as viewed in section perpendicular to the longitudinal direction A. The mechanical connection between the battery unit 100 and the atomizing unit 200 is secured by fitting (for example, screwing) of the external electrode 135 and the external electrode 212.

The atomizing portion 220 includes a reservoir 221, a tubular member 222, a heater unit 223, and a cap 224. The reservoir 221 holds the aerosol-generating material. For example, the aerosol-generating material contains liquid, such as glycerin and propylene glycol. For example, the reservoir 221 has a double-layered structure. An inner layer 221A is made of cotton, and an outer layer 221B is made of polyester. The reservoir 221 may have a single-layered structure. The tubular member 222 forms an air passage leading along the longitudinal direction A. The tubular member 222 is inserted in the reservoir 221. The tubular member 222 has a slit 222A that holds the heater unit 223. For example, the tubular member 222 is made of fiberglass. The heater unit 223 heats the aerosol-generating material transmitted from the reservoir 221. For example, the heater unit 223 includes a wick 223A and the heater 223B. The wick 223A is disposed to intersect the air passage. The wick 223A is held by the slit 222A. The wick 223A holds the aerosol-generating material transmitted from the reservoir 221 through a capillary phenomenon. The heater 223B atomizes the aerosol-generating material that is held by the wick 223A. The heater 223B is an electrically heated wire having a coil-like shape which is wound around the wick 223A. A cap 224 covers the reservoir 221 from a direction of the flavor unit 300. The cap 224 is provided with an opening that forms an air passage.

(Distal Portion)

Figure 4:
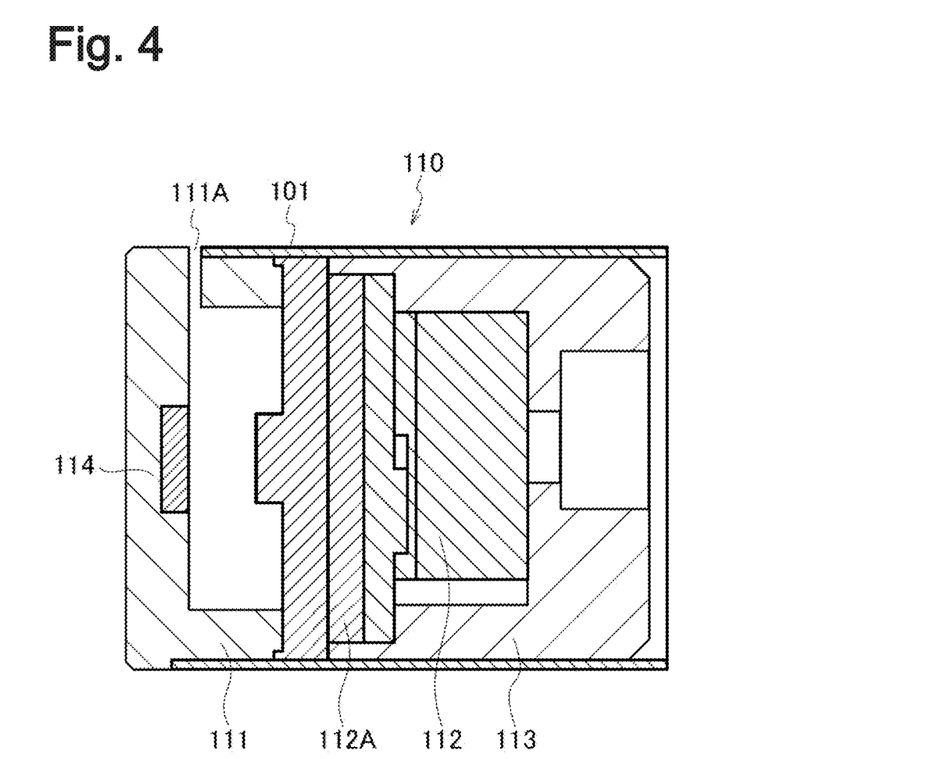
FIG. 4 is a sectional view showing a distal portion 110 according to the embodiment.

The distal portion according to the embodiment will be described below. FIG. 4 is a sectional view showing the distal portion 110 according to the embodiment. As explained with reference to FIG. 2, the distal portion 110 is located across the battery 123 from the connecting portion 130. The distal portion 110 includes the cover 111, the electronic component 112, and the base member 113. According to the embodiment, the distal portion 110 is an example of the predetermined portion in which the electronic component 112 is located.

As illustrated in FIG. 4, the distal portion 110 includes a water detection member 114 configured to detect water that enters the distal portion 110. The water detection member 114 may be configured as capable of recognizing whether water enters the distal portion 110. For example, the water detection member 114 is transformed by water contact. The transformation may be a change in color, dissolution or expansion (swelling). The water detection member 114 may be a seal attached to the cover 111. As discussed above, the electronic component 112 includes the base plate 112A. The base plate surface of the base plate 112A is provided with the CPU, the memory, the light-emitting element, the inhalation sensor, and the like. The electronic component 112 is accommodated in the housing 101.

The water detection member 114 is located in a portion other than the air passage leading from the air inlet to the air outlet. For example, the water detection member 114 may be located on an opposite side of the air inlet from the air outlet. In other words, the air inlet is located between the water detection member 114 and the air outlet. The air inlet may be located in the boundary portion between the battery unit 100 and the atomizing unit 200 as described above. That is to say, the water detection member 114 is located in such a position that the aerosol released from the atomizing unit 200 does not contact the water detection member 114. According to the embodiment, the water detection member 114 is located across the electronic component 112 from the battery 123. The water detection member 114 therefore may be considered as a member for detecting the water that enters the distal portion 110, rather than a member for detecting the water that enters the battery portion 120.

(Inhalation Sensor)

Figure 5:
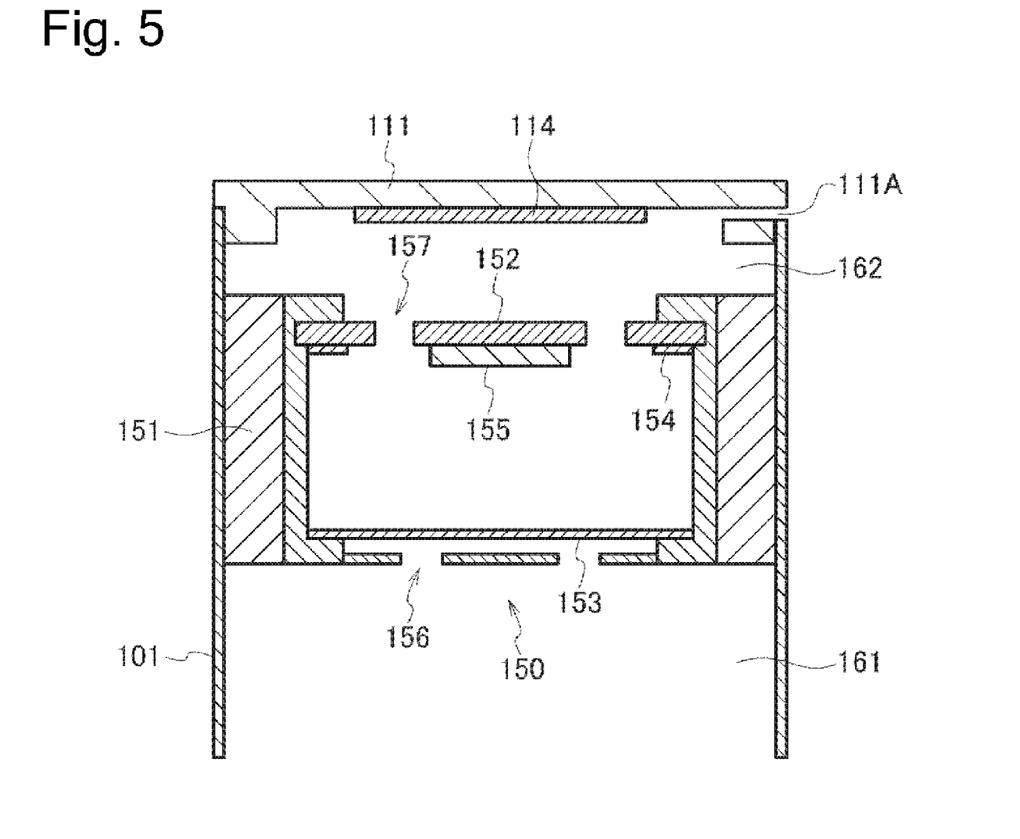
FIG. 5 is an explanatory view of an inhalation sensor 150 according to the embodiment.

The inhalation sensor according to the embodiment will be described below. FIG. 5 is an explanatory view of an inhalation sensor 150 according to the embodiment. The inhalation sensor 150 detects the puffing action and is an example of the electronic component 112.

As illustrated in FIG. 5, the inhalation sensor 150 detects a change in inner pressure of a hollow space formed inside the housing 101. The housing 101 includes a first hollow space 161 and a second hollow space 162 which are separated by the inhalation sensor 150 so as not to come into communication with each other. The first hollow space 161 is a hollow space in communication with the air inlet for inhaling air by the puffing action. The second hollow space 162 is in communication with an opening 111A that is in communication with exterior space of the housing 101.

In the foregoing configuration, the inhalation sensor 150 detects differential pressure between the inner pressure of the first hollow space 161 and the inner pressure of the second hollow space 162. For example, the inhalation sensor 150 is a sensor with a condenser and outputs a value (for example, a voltage value) indicating an electricity amount of the condenser according to the differential pressure between the inner pressure of the first hollow space 161 and the inner pressure of the second hollow space 162.

For example, the inhalation sensor 150 includes a support member 151, a base plate 152, an electrode film 153, a fixed electrode 154, a control circuit 155, an opening 156, and an opening 157 as illustrated in FIG. 5. There is no gap between the support member 151 and the housing 101. The first hollow space 161 and the second hollow space 162 are separated by the inhalation sensor 150 so as not to come into communication with each other within the housing 101. The base plate 152 is provided with the fixed electrode 154 and the control circuit 155. The electrode film 153 is deformed according to a change in differential pressure between the inner pressure of the first hollow space 161 and the inner pressure of the second hollow space 162. The fixed electrode 154 forms the electrode film 153 and the condenser. The condenser has an electric capacity that is changed by the deformation of the electrode film 153. The control circuit 155 detects the electric capacity that is changed by the deformation of the electrode film 153. More specifically, the inner pressure of the first hollow space 161 is reduced by the puffing action, whereas the inner pressure of the second hollow space 162 is substantially not changed by the puffing action and is approximately equal to atmospheric pressure. In short, the inhalation sensor 150 detects a pressure change in the first hollow space 161.

According to the embodiment, the opening 111A is located in the distal portion 110. The cover 111 has a cutout. The opening 111A is a gap between the cover 111 and the housing 101. The opening 111A is located in a lateral wall of the distal portion 110. The water detection member 114 may be located in an inner end face of the distal portion 110.

According to the embodiment, at least a part of a portion of the electronic component 112, which is exposed to the space (second hollow space 162 in the present specification) that is in communication with the opening 111A, may be coated with a liquid impermeable member. For example, the liquid impermeable member may be fluorine resin or silicon. A coating method using the liquid impermeable member is not particularly limited. The coating method may be performed by spraying or hand-painting. Even in these cases, the inhalation sensor 150 is exposed to the space (second hollow space 162 in the present specification) that is in communication with the opening 111A, which means that the inhalation sensor 150 is not entirely coated with the liquid impermeable member. In other words, the inhalation sensor 150 is exposed to the second hollow space 162 in communication with the exterior space of the housing 101 through the opening 111A so that the inner pressure of the second hollow space 162 is approximately equal to the atmospheric pressure.

(Operation and Advantageous Effects)

According to the embodiment, the distal portion 110 in which the electronic component 112 is located includes the water detection member 114 configured to detect the water that enters the distal portion 110. This makes it possible to recognize deterioration of the electronic component 112, which is caused by the water that enters the predetermined portion 110.

Other Embodiments

The invention has been discussed with the embodiment. It should be noted that the description and drawings forming a part of the present disclosure do not limit the invention. Various alternative aspects, embodiments, and operation techniques will become clearly known by ordinarily skilled persons through the present disclosure.

According to the embodiment, the predetermined portion in which the electronic component 112 is located is the distal portion 110. The embodiment, however, does not necessarily have to be configured that way. The predetermined portion may be the connecting portion 130. In such a case, the water detection member 114 may be located in a portion other than the air passage leading from the air inlet to the air outlet as in the embodiment. For example, the water detection member 114 may be located on the opposite side of the air inlet from the air outlet (for example, a non-mouthpiece side or a distal end side).

According to the embodiment, the inhalation sensor 150 is a sensor of a type which detects the differential pressure between the inner pressure of the first hollow space 161 and the inner pressure of the second hollow space 162. The embodiment, however, does not necessarily have to use the above-described sensor. Instead of the inhalation sensor 150, another sensor may be utilized. In such a case, the opening 111A does not have to be provided.

According to the embodiment, the flavor inhaler 10 includes the flavor unit 300. The embodiment, however, does not necessarily have to be provided with the flavor unit 300. The flavor inhaler 10 does not have to include the flavor unit 300. In such a case, the aerosol-generating material may contain a flavor-generating material.

The invention claimed is:

1. A battery unit installed in a flavor inhaler with an atomizing unit that atomizes an aerosol-generating material according to a puffing action of inhaling air through an air passage leading from an air inlet to an air outlet, the battery unit comprising:
a battery;
an electronic component configured to control the atomizing unit, and
a housing configured to accommodate the battery and the electronic component,
wherein the electronic component is located in a predetermined portion of the battery unit,
wherein the predetermined portion includes a water detection member configured to detect water that enters the predetermined portion, and
wherein the water detection member is located in a portion other than the air passage.

2. The battery unit according to claim 1, wherein the predetermined portion is provided with an opening in communication with exterior space of the housing.

3. The battery unit according to claim 1, wherein the battery unit has a shape extending along a longitudinal direction, and includes a connecting portion that mechanically connects the battery unit and the atomizing unit and a distal portion located across the battery from the connecting portion, and
wherein the predetermined portion is the distal portion.

4. The battery unit according to claim 1, wherein the water detection member is located on an opposite side of the air inlet from the air outlet.

5. The battery unit according to claim 1, wherein the water detection member is located across the electronic component from the battery.

6. The battery unit according to claim 1, wherein the electronic component includes an inhalation sensor configured to detect the puffing action.

7. The battery unit according to claim 2, wherein the electronic component includes an inhalation sensor configured to detect the puffing action;
wherein the housing includes a first hollow space and a second hollow space which are separated by the inhalation sensor so as not to come into communication with each other;
wherein the first hollow space is in communication with the air inlet; and
wherein the second hollow space is in communication with the opening.

8. The battery unit according to claim 2, wherein the battery unit has a shape extending along a longitudinal direction, and includes a connecting portion that mechanically connects the battery unit and the atomizing unit and a distal portion located across the battery from the connecting portion,
   wherein the predetermined portion is the distal portion,
   wherein the opening is located in a lateral surface of the distal portion, and wherein the water detection member is located in an inner end face of the distal portion.

9. The battery unit according to claim 2, wherein at least a part of a portion of the electronic component, which is exposed to space in communication with the opening, is coated with a liquid impermeable member.

10. The battery unit according to claim 9, wherein the electronic component includes an inhalation sensor configured to detect the puffing action, and
   wherein the inhalation sensor is exposed to the space in communication with the opening.

11. A flavor inhaler comprising:
   an atomizing unit configured to atomize an aerosol-generating material according to a puffing action of inhaling air through an air passage leading from an air inlet to an air outlet, and
   a battery unit,
   wherein the battery unit includes a battery, an electronic component configured to control the atomizing unit, and a housing configured to accommodate the battery and the electronic component;
   wherein the electronic component is located in a predetermined portion of the battery unit,
   wherein the predetermined portion includes a water detection member configured to detect water that enters the predetermined portion, and
   wherein the water detection member is located in a portion other than the air passage.

* * * * *